Patented Jan. 12, 1932

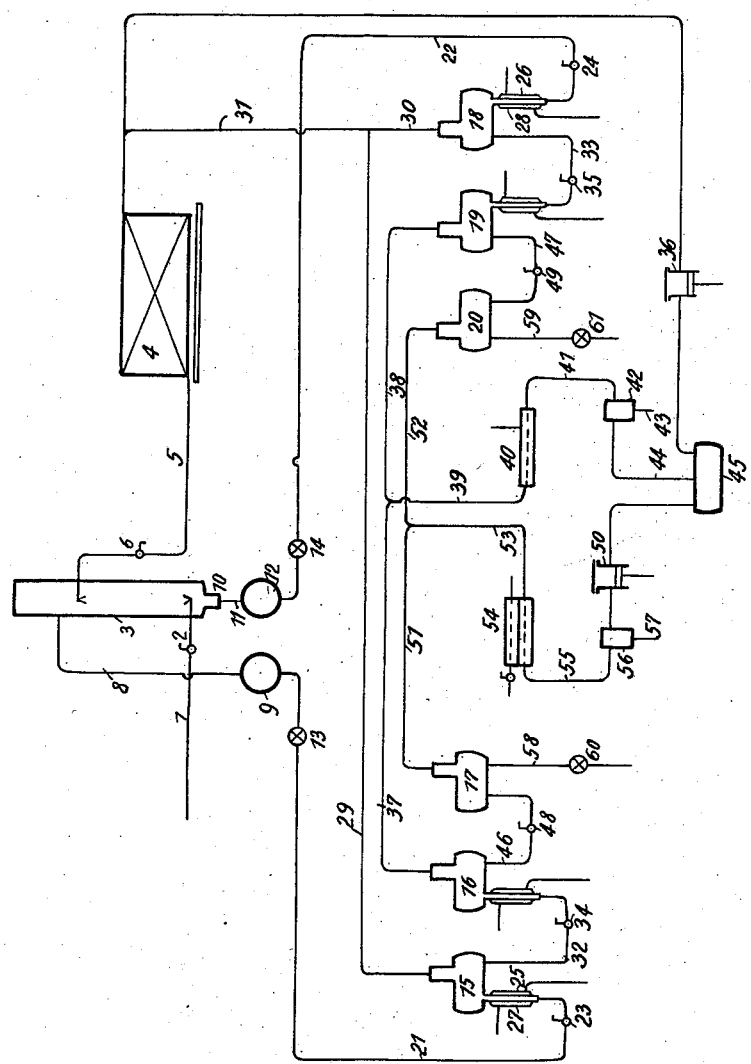

1,840,765

UNITED STATES PATENT OFFICE

GUISEPPE CATTANEO, OF HILVERSUM, NETHERLANDS, LAZAR EDELEANU, OF BERLIN-CHARLOTTENBURG, WILHELM HESS, OF BERLIN-GROB-LICHTERFELDE-WEST, PAUL JODECK AND IGNAZ ROSENBERG, OF BERLIN, GERMANY, ASSIGNORS TO "EDELEANU" GESELLSCHAFT M. B. H., OF BERLIN, GERMANY, A CORPORATION OF GERMANY

PROCESS FOR THE CONTINUOUS TREATMENT OF HYDROCARBONS

Application filed May 10, 1927, Serial No. 190,274, and in Germany November 15, 1926.

This invention relates to a process for continuously treating liquid hydrocarbons of mineral oils with liquid sulphur dioxide widely known as the Edeleanu process, and aims to improve its efficiency, and regular smooth operation.

As it is now generally practiced, the process consists in continuously mixing hydrocarbons with liquid sulphur dioxide. Thereby the unsaturated and aromatic hydrocarbons dissolve in the liquid sulphur dioxide, while the saturated hydrocarbons remain undissolved. Two layers are formed, which are separated from each other. The part dissolved in the liquid sulphur dioxide is called extract and the undissolved part is called raffinate.

The continuous treatment, however, does not only consist in the mixing and evaporating of the hydrocarbons in a continuous manner. Provision must also be made for continuous evaporation of the liquid sulphur dioxide from the extract and raffinate solution, in order to regain the liquid sulphur dioxide without loss and in such a state of purity that it may steadily be re-used. The invention consists inter alia in effecting the evaporation of the sulphur dioxide in several stages, in arranging for continuous heat exchange between treated and untreated oil and sulphur dioxide in condensing adhering oil from the sulphur dioxide vapour, and in the method of working generally.

The invention enables the continuous evaporation and recovery of sulphur dioxide in the desired pure state with the least expenditure of energy with absolute safety and in a condition such that it can be re-employed without further treatment in the cycle of operations.

The attached drawing illustrates suitable apparatus for the execution of the process in accordance with the present invention.

The oil which is to be worked up, for example, kerosene, transformer oil, light lubricating oil or the like, after preliminary cooling by very effective interchange of heat within the apparatus and further cooling by evaporating liquid sulphur dioxide to the temperature necessary for the extraction, is caused to enter the mixer 3 from below by a supply tube 1. A valve 2 serves to control the quantity of oil introduced.

The requisite quantity of liquid sulphur dioxide for the treatment is conducted from the condenser tank 4 under the pressure prevailing therein through a tube 5 and a controlling valve 6 to the upper part of the mixer 3. The sulphur dioxide is previously cooled by suitable interchange of heat to the temperature required for the treatment.

In the mixer 3, the oil which is introduced at the bottom ascends while the liquid sulphur dioxide entering at the top, being heavier than the oil descends. The ascending oil becomes saturated with sulphur dioxide on its upward path, the aromatic hydrocarbons, which at the low temperature are very soluble in the sulphur dioxide, then separate and descend dissolved in the sulphur dioxide.

As the oil rises it encounters sulphur dioxide containing less and less aromatic portions until finally in the upper part of the mixer 3 the oil, now containing only slight amounts of aromatic components, comes in contact with practically pure sulphur dioxide which extracts the last heavy constituents from the oil. The washing process taking place in the mixer is thus progressive and continues from below upwards. The raffinate containing a relatively small quantity of sulphur dioxide in solution (about 12 to 15 per cent), is conducted through a tube 8 into a storage tank 9, while the sulphur dioxide extract mixture, which collects in the lower portion 10 of the mixer 3 is caused to flow through a tube 11 into a storage tank 12.

The raffinate sulphur dioxide mixture and extract sulphur dioxide mixture are then withdrawn from the tanks 9 and 12 by means of pumps 13 and 14 and, after preheating by effective heat interchange within the apparatus, are introduced into evaporators 15, 16 and 17 and 18, 19 and 20 respectively through tubes 21 and 22 and controlling valves 23 and 24.

The evaporation of the sulphur dioxide from the two mixtures in the respective evaporators is now caused to proceed continuously in order to remove even the last traces of sulphur dioxide in any desired number of steps, depending on the nature of the oils to be treated and the size of the plant. In the present case, three stages are illustrated: the main evaporator, the medium pressure evaporator and the vacuum evaporator.

In the first stage the so-called main evaporators 15 and 18 effect the evaporation of the sulphur dioxide merely by heat, whereas, in the subsequent stages called low or medium pressure and vacuum stages, respectively, this is effected by heating and simultaneous reduction of pressure, the pressure in the last evaporator being as low as about 20 mm. of mercury. In the last stage the supply of heat may be dispensed with, since only small residues of sulphur dioxide are contained in the raffinate and extract, and the heat required for evaporation can be supplied from the circulating liquids without essentially lowering the temperature.

The main evaporators may consist of several vertically arranged evaporating tubes 25 and 26 provided with surrounding heating tubes 27 and 28 and above them the vessels 15 and 16; and the source of heat may be live or waste steam. The two sulphur dioxide fractions enter at the bottom of the evaporating tubes 25 and 26 and progress upwards. Due to the action of the heat a rapid evaporation of sulphur dioxide occurs, the resulting gas bubbles forcing their way upwards and causing violent eddying of the liquids in the tubes, so that the heat exchange is extremely active.

The mixture of sulphur dioxide vapours with raffinate and extract respectively then enter the vessels 15 and 18 and there separate.

The gaseous sulphur dioxide coming from the main evaporators 15, 18 passes under its own pressure through tubes 29 and 30, which unite in a tube 31, to the condenser supply tank 4, where liquefaction takes place by the action of cooling water. The pressure in the condenser tank depends on the water available for cooling and normally amounts to about 3.5 to 4 atmospheres.

The two fractions of raffinate and extract now freed from all but a small percentage of sulphur dioxide leave the main evaporators 15 and 18 by tubes 32 and 33 and flow to the apparatus used in the next stage of the process through control valves 34 and 35 into the intermediate or medium pressure evaporators 16 and 19. In these evaporators a pressure of about 0.75 to 1 atm. abs. is maintained by means of one or more compressors 36 which suck the vapors from the low or medium evaporators. The evaporators are similar in their construction to the main evaporators 15 and 18 and are heated, if desired, with either live or waste steam.

Under the influence of the reduced pressure and heating the fractions of raffinate and extract are freed from all but a small amount of sulphur dioxide.

The sulphur dioxide gases which separate from the fractions of raffinate and extract in the medium pressure evaporators are forced through tubes 37 and 38 by the compressor 36, unite in the tube 39 and flow into a mixing tube 40, in which cold sulphur dioxide vapour from the cyclical process is admixed, whereby the mixed vapours are cooled to about 5° C. This causes the condensation of the vapours of oil of low boiling point still present to a small extent in the fractions of raffinate and extract; and which evaporate together with the sulphur dioxide. The sulphur dioxide vapours, together with the light hydrocarbons, leave the mixing tube 40 by a tube 41 and pass through a separator 42, where the condensed light hydrocarbons separate and are withdrawn from time to time by a tap 43. The sulphur dioxide vapours freed from the light oils pass through a tube 44 and a chamber 45 to the compressor 36, where they are compressed and led to the condenser 4 in which they are liquefied, the sulphur dioxide being then re-used in a further cycle of operations.

The fractions of raffinate and extract flow from the medium pressure evaporators 18 and 19 through tubes 46 and 47 and control valves 48 and 49 to the vacuum evaporators 17 and 20 in which a high vacuum is maintained.

The fractions of raffinate and extract are not now subjected to further heating, they give off the remainder of the sulphur dioxide (leaving only about 0.5%) solely under the influence of their own heat and high vacuum which is maintained by a vacuum pump 50 which sucks the vapors out of the evaporators 17 and 20. The sulphur dioxide vapors which are pumped off leave the evaporators 17 and 20 by tubes 51 and 52, unite in a tube 53 and pass through a low temperature gas cooler 54, which is cooled by evaporating sulphur dioxide. Here again, as in the intermediate stage, light hydrocarbons condense and pass with the stream of sulphur dioxide gas through a tube 55 into a separator 56, where the condensed oil and other contaminations separate and are withdrawn from time to time by a tap 57. The vacuum pump 50 causes the sulphur dioxide vapours to pass on and forces them into the container 45 connected with the medium pressure stage.

The two final fractions of raffinate and extract which are now free from sulphur dioxide flow through tubes 58 and 59 to pumps 60 and 61 and, after appropriate heat interchange within the apparatus which cools them to room temperature, they are pumped into storage tanks.

As previously described, the process is such that in the main evaporator the sulphur dioxide gas is brought to the pressure of the condenser tank solely by a heating process. In the further evaporators used in the process (in the example chosen there being two additional stages) the sulphur dioxide is evaporated by the combined action of heat and reduction of pressure or by reduced pressure alone. The sulphur dioxide vapors arising from the high vacuum evaporators are first brought by suitable appliances to the pressure of the sulphur dioxide gases of the preceding stage and then transferred from the common storage vessel by compressors or pumps to the condenser tank. The sulphur dioxide gases are in all cases first freed from any contaminating oil vapors after leaving the evaporators and are then united.

The foregoing description is illustrative of the process, which essentially consists:

(A) In uniting the vapors which derive from the parallel pressure stages of the raffinate and extract evaporators.

(B) In cooling the vapors deriving from the parallel pressure stages of the raffinate and extract evaporators (after being united) whereby low boiling hydrocarbons which passed over from the evaporators, are condensed and separated from the sulphur dioxide vapors.

(C) In bringing the pressure of the sulphur dioxide vapors of the vacuum evaporator (after their purification) up to that of the vapors of the intermediate pressure evaporators by compressors, and, by further compressing, in bringing the pressure of the combined vacuum and low or medium pressure vapors up to that of the watercooled condenser where they are liquefied.

The evaporation of the sulphur dioxide vapors takes place within a pressure scope ranging from the pressure of the watercooled condenser down to a very low vacuum. On the other hand the expelled vapors move the opposite way to the condenser, that is by multistage increase of pressure, beginning with the vacuum of the lowest stage evaporator up to the pressure of the condenser.

Where in the present application hydrocarbons are referred to the hydrocarbons from mineral oils are primarily inferred, but the process can be also applied to the working up of hydrocarbons obtained from the distillation of coal tars or tar from brown coal especially when the working up of both kinds of coal takes place at low temperatures.

Having now particularly described and ascertained the nature of our said invention and in what manner the same is to be performed, we declare that what we claim is:—

1. A process for the continuous treatment of hydrocarbon oils with liquid sulphur dioxide in which the resulting fractions (extract and raffinate) are respectively led in succession into separate series of evaporators respectively maintained at decreasing orders of pressure and the gasses evolved in the evaporators of the same order of pressure are combined and led into cooling vessels in which any light boiling oils are condensed and separated from the sulphur dioxide.

2. A process for the continuous treatment of hydrocarbon oils with liquid sulphur dioxide in which the resulting fractions from the mixer are separately subjected to a continuous evaporation process divided into several stages of different pressure and the sulphur dioxide vapors and light oil vapors from the same stage of each separate fraction are led to a common cooling device and thence to a separator where the condensed light hydrocarbons are withdrawn, and the sulphur dioxide vapors after compression by a suitable pump are condensed and led to a storage tank.

3. A process for the continuous treatment of hydrocarbon oils with liquid sulphur dioxide in which the resulting fractions from the mixer are separately subjected to a continuous evaporation process divided into several stages of different pressure from several atmospheres down to a high vacuum, and the sulphur dioxide vapors and light oil vapors from the same stage of each separate fraction are led to a common cooling device and thence to a separator where the condensed light hydrocarbons are withdrawn, and the sulphur dioxide vapors from each stage after compression by suitable pumping apparatus to the original liquid pressure are led to a collector tank from which they are again returned as required to the mixer.

4. A cyclical process for the continuous treatment of hydrocarbon oils with liquid sulphur dioxide in which the resulting fractions from the mixer are separately subjected to a continuous evaporation process divided into several stages of different pressure and the sulphur dioxide vapors and light oil vapors from the same stage of each separate fraction are led to a common cooling device in which cold sulphur dioxide from the cyclical process is admixed and thence to a separator where the condensed light hydrocarbons are withdrawn, and the remaining sulphur dioxide vapors are subjected to compression by a suitable pump and united with sulphur dioxide vapors from another stage at the higher pressure, and said united vapors are led to a condenser and storage tank.

5. A cyclical process for the continuous treatment of hydrocarbon oils with liquid sulphur dioxide in which the resulting fractions from the mixer are separately subjected to a continuous evaporation process divided into several stages of different pressure and the sulphur dioxide vapors and light oil vapors from the same stage of each separate fraction are led to a common cooling device in which cold sulphur dioxide from the cyclical process is admixed and thence to a separator where the condensed light hydrocarbons are withdrawn, and the sulphur dioxide vapors after compression by a suitable pump are led to a condenser and storage tank from which they are again returned as required to the mixer.

6. A process for the continuous treatment of hydrocarbon oils with liquid sulphur dioxide in which the resulting fractions from the mixer are separately subjected to a continuous evaporation process divided into several stages of different pressure, completing the evaporation under comparatively high vacuum without addition of heat, uniting the sulphur dioxide vapors from the corresponding pressure stages of each separate fraction, separating low boiling oils from the low pressure sulphur dioxide vapors, raising the pressure of said low pressure vapors and uniting them with vapors from a higher pressure stage, and condensing the united vapors and then returning the condensed vapors as required to the mixer.

7. A process for the continuous treatment of hydrocarbon oils with liquid sulphur dioxide in which the resulting fractions from the mixer are separately subjected to a continuous evaporation process divided into several stages of different pressure, completing the evaporation under comparatively high vacuum without addition of heat, uniting the sulphur dioxide vapors from the corresponding pressure stages of each separate fraction, separating low boiling oils from the low pressure sulphur dioxide vapors by cooling, compressing said sulphur dioxide vapors after being freed from any contaminating oil vapors, uniting said compressed and uncompressed vapors (the latter deriving from the condenser pressure evaporators) and condensing the united vapors.

8. A process for the continuous treatment of hydrocarbon oils with liquid sulphur dioxide in which the resulting fractions from the mixer are separately subjected to a continuous evaporation process divided into several stages of different pressure, uniting the sulphur dioxide vapors from the corresponding pressure stages of each separate fraction, separating low boiling oils from the low pressure sulphur dioxide and compressing said sulphur dioxide vapors after being freed from any contaminating oil vapors and uniting them with sulphur dioxide vapors from a higher pressure stage, condensing the united vapors and returning them as required to the mixer.

9. A process for the continuous treatment of hydrocarbon oils with liquid sulphuric dioxide in which the resulting fractions (extract and raffinate) from the mixer are separately subjected to a continuous evaporation process divided into several pressure stages, including a high vacuum last stage, and the sulphur dioxide vapors of each separate fraction passing from the respective evaporators in the second and subsequent stages are united in each stage and freed from any contaminating oil vapors by cooling and thereafter the cooled vapors of the vacuum stage are raised to the pressure of the preceding stage and the vapors from both said stages are united and treated together to increase their pressure and are then led to a collector tank from which they are again returned as required to the mixer.

10. A process for the continuous recovery of sulphur dioxide from hydrocarbon oils mixed therewith which comprises subjecting the oils to a continuous evaporation process, divided into several stages of different pressure, the last stage being under a comparatively high vacuum, and separating low boiling oils from sulphur dioxide before passing through a condenser.

11. A process for the continuous recovery of sulphur dioxide from hydrocarbon oils mixed therewith which comprises subjecting the oils to a continuous evaporation process, divided into several stages of different pressure, in which the sulphur dioxide is removed in the first stage principally by the action of heat, in the next stage by the combined action of heat and reduced pressure and in the last stage under comparatively high vacuum, and separating low boiling oils from sulphur dioxide before passing through a condenser.

12. A process for the continuous recovery of sulphur dioxide from hydrocarbon oils mixed therewith which comprises subjecting the oils to a continuous evaporation process, divided into several stages of different pressure, in which the sulphur dioxide is removed in the first stage principally by the action of heat, in the next stage by the combined action of heat and reduced pressure and in the last stage under comparatively high vacuum, and separating low boiling oils by condensation from the sulphur dioxide before passing the sulphur dioxide through a condenser.

13. A process for the continuous recovery of sulphur dioxide from hydrocarbon oils containing the same which comprises subjecting the oils to a continuous evaporation process, divided into several stages of different pressure, the sulphur dioxide removed in the first stage flowing under its own pressure into a condenser maintained at a pressure above atmospheric and the sulphur dioxide removed in the subsequent stage being raised by a compressor to the pressure of the said condenser before admission thereto, and separating low boiling oils from sulphur dioxide before passing through a condenser.

14. A process for the continuous recovery of sulphur dioxide from hydrocarbon oils containing the same which comprises subjecting the oils to a continuous evaporation process, divided into several stages of varying pressure, and raising the vapours evolved in each stage to the pressure of the vapours prevailing in the preceding stage, and separating low boiling oils from sulphur dioxide before passing through a condenser.

15. A process for the continuous recovery of sulphur dioxide from hydrocarbon oils containing the same which comprises subjecting the oils to a continuous evaporation process, divided into several stages of varying pressure, completing the evaporation under comparatively high vacuum, and raising the vapours evolved in each stage to the pressure of the vapours prevailing in the preceding stage, and separating low boiling oils from sulphur dioxide before passing through a condenser.

In testimony whereof we have signed our names to this specification.

GUISEPPE CATTANEO.
LAZAR EDELEANU.
WILHELM HESS.
PAUL JODECK.
IGNAZ ROSENBERG.